(12) United States Patent
Park et al.

(10) Patent No.: US 8,920,961 B2
(45) Date of Patent: Dec. 30, 2014

(54) LITHIUM ION BATTERY SEPARATOR WITH SHUTDOWN PROPERTY

(71) Applicant: Samsung Total Petrochemicals Co., Ltd., Seosan-si (KR)

(72) Inventors: Dae Ho Park, Seoul (KR); Do Hoon Lee, Seosan-si (KR)

(73) Assignee: Samsung Total Petrochemicals Co., Ltd., Seosan-Si (KR)

( * ) Notice: Subject to any disclaimer, the term of this patent is extended or adjusted under 35 U.S.C. 154(b) by 5 days.

(21) Appl. No.: 13/722,360

(22) Filed: Dec. 20, 2012

(65) Prior Publication Data

US 2013/0164597 A1 Jun. 27, 2013

(30) Foreign Application Priority Data

Dec. 21, 2011 (KR) .......................... 10-2011-0139156

(51) Int. Cl.
*H01M 2/16* (2006.01)
*H01M 2/14* (2006.01)

(52) U.S. Cl.
CPC .............. *H01M 2/16* (2013.01); *H01M 2/1686* (2013.01); *H01M 2/1653* (2013.01); *H01M 2/145* (2013.01)
USPC .......................................... 429/145; 429/254

(58) Field of Classification Search
CPC ...... Y02E 60/12; H01M 2/14; H01M 2/1653; H01M 2/1686; H01M 2/145
USPC .......................................... 429/129, 145, 254
See application file for complete search history.

(56) References Cited

U.S. PATENT DOCUMENTS

| | | | |
|---|---|---|---|
| 5,691,077 A | 11/1997 | Yu | |
| 2009/0181295 A1* | 7/2009 | Usami et al. | 429/145 |
| 2009/0281259 A1 | 11/2009 | Park et al. | |
| 2011/0212358 A1* | 9/2011 | Usami et al. | 429/145 |
| 2012/0015229 A1* | 1/2012 | Ohashi et al. | 429/144 |

FOREIGN PATENT DOCUMENTS

| | | |
|---|---|---|
| KR | 10-2006-0038101 | 5/2006 |
| KR | 10-2006-0038102 | 5/2006 |
| WO | WO 2010104077 A1 * | 9/2010 |

OTHER PUBLICATIONS

US 20120015229 is an English Translation of the WO 2010/104077 prior art.*

* cited by examiner

*Primary Examiner* — Stewart Fraser
(74) *Attorney, Agent, or Firm* — Harness, Dickey & Pierce, P.L.C.

(57) ABSTRACT

Provided is a microporous separator for a lithium secondary battery having shutdown properties wherein the separator comprises a propylene random copolymer which has a melt index of 0.5-10 g/10 minutes and comprises one or more species of comonomers in the content of 0.1-8 wt %.

3 Claims, No Drawings

LITHIUM ION BATTERY SEPARATOR WITH SHUTDOWN PROPERTY

CROSS-REFERENCE TO RELATED APPLICATION

This application claims the benefit and priority of Korean Application No. KR 10-2011-0139156 filed on Dec. 21, 2011. The entire disclosure of the above application is incorporated herein by reference.

TECHNICAL FIELD OF THE INVENTION

The present invention relates to a separator for a lithium secondary battery which has shutdown properties, specifically to a microporous separator for a lithium secondary battery having shutdown properties, wherein the separator comprises a propylene random copolymer resin which has a melt index of 0.5-10 g/10 minutes and comprises one or more species of comonomers in the amount of 0.1-8 wt %.

BACKGROUND OF THE INVENTION

A separator for a lithium secondary battery is a porous thin film present between a positive electrode and a negative electrode, for facilitating the transmitting lithium cations during a charging/discharging process, and is generally produced with polyolefin resins such as polypropylene, polyethylene and the like in view of cost, chemical resistance, tensile strength, ionconductivity and the like.

The microporous separator made of a polyolefin resin is produced by a dry process using uniaxial orientation of an extruded polyolefin film, or a wet process which comprises blend/extrusion of liquid paraffin/high density polyethylene (HDPE)/ultra high molecular weight polyethylene(UHMWPE), biaxial orientation of the resulted product, and removal of liquid paraffin by using an organic solvent.

The wet process has some disadvantages such that it requires the use of liquid paraffin and an organic solvent, and the procedure is complex. In the dry process, particularly in the step of resin extrusion, the polymer chain is derived to be oriented to the machine direction(MD) so that crystallization can occur in the state that a lamellae layer is oriented to the transverse direction(TD), thereby directing the layered structure to be formed along MD. The dry process is simple and thus advantageous in terms of economy, as compared to the wet process, and eco-friendly as it does not employ an organic solvent.

As a safety function in a lithium secondary battery for preventing thermal runaway in the battery when it is overheated, a shutdown function is required in a separator. The term "shutdown function" refers to, when a battery is overheated, a function for preventing the battery from being further overheated by shutdown of the holes so as to block the migration of positive lithium ions before degradation of a positive electrode material occurs.

In the case of a monolayer film prepared via a dry process using a propylene homopolymer, an effective shutdown function cannot be exerted owing to the high melting point (about 160° C.) of the propylene homopolymer. On the contrary, in the case of a porous film prepared from a high density polyethylene, it is easy to ensure the shutdown properties since the high density polyethylene has a low melting point (about 130° C.). However, particularly in the case of a porous film prepared from a high density polyethylene via a dry process, mechanical properties such as tensile strength of thus obtained separator are inferior to a common polypropylene separator, and the battery can be excessively overheated, possibly leading to melt-down of the separator. For solving the problem, for example, U.S. Pat. No. 5,691,077 proposed a multilayer separator prepared by a dry process, which is formed of the layer of polypropylene/polyethylene/polypropylene. Such multilayer separator can advantageously have a shutdown function from polyethylene as well as high tensile strength/melt-down blocking function from polypropylene, however it can be obtained by far too complex manufacturing process which comprises preparing a polypropylene precursor film and a polyethylene precursor film respectively; and either carrying out lamination and elongation of the precursor films, or carrying out elongation of each precursor film, forming pores and laminating them. Therefore, owing to such complex process much higher manufacturing cost is needed and there is a risk of destruction of a pore structure during the lamination process.

SUMMARY OF THE INVENTION

The purpose of the present invention is to provide a separator for a lithium secondary battery with a high mechanical strength and shutdown properties.

DETAILED DESCRIPTION OF THE INVENTION

A separator for a lithium secondary battery according to the present invention is characterized by consisting of a microporous monolayer film comprising a propylene random copolymer resin which has a melt index of 0.5-10 g/10 minutes and comprises one or more species of comonomers in the amount of 0.1-8 wt %.

Further, the separator for a lithium secondary battery according to the present invention may further comprise a microporous melt-down blocking layer placed on either or both sides of said microporous monolayer film.

As for the propylene random copolymer resin used in the separator for a lithium secondary battery of the present invention, a resin having a lower melting point than the melting point of a propylene homopolymer is advantageously used, in order to achieve the purpose of the present invention, i.e. better shutdown property. The propylene random copolymer is a resin comprising propylene as a major monomer unit in the polymer chain and at least one or more comonomers other than propylene which are intermittently introduced into the polymer chain. The non-limiting examples of the comonomers include monomers having a vinyl group, represented by a general formula $CH_2=CH-R$, wherein R is H or a hydrocarbon group having C2-20. The species of the comonomers in the monomer units may be one or two or more. The most preferred comonomer is ethylene(R=H) and 1-butene (i.e., carbon number of R is 2) in terms of economic point of view.

The total content of the comonomers in said propylene random copolymer used in the present invention is preferably 0.1-8 wt %. When the content is less than 0.1 wt %, shutdown property may not properly function owing to high melting point of the resulted propylene random copolymer, and when it is more than 8 wt %, crystallinity of a precursor film that is prepared before the porous film preparation is insufficient, possibly causing poor pore formation at elongation stage, disadvantageously.

The melt index(MI) of the propylene random copolymer resin measured according to ASTM D1238 is preferably 0.5-10 g/10 minutes at 230° C. and under a load of 2.16 kg. When the melt index is less than 0.5 g/10 minutes, the flowability of a resin is disadvantageously lowered during a film extrusion process and the density of tie molecules between lamellae in the extruded film becomes too high, possibly making the micropore formation, i.e. the purpose of the present invention, poor. When the melt index is more than 10 g/10 minutes, the polymer chain orientation during the film extrusion process is not sufficiently made, which may cause an improper pore formation during the later elongation process and further possibly have poor mechanical properties including tensile strength of the resulted micropore film of the present invention, thereby being disadvantageous.

As for the propylene random copolymer resin used in the present invention, used may be one species of propylene random copolymer resin or a blend of propylene random copolymer resins having different melt index. Further, a propylene random copolymer resin having side chains may be used, within the scope for achieving the purposes of the present invention.

As for a catalyst for the propylene random copolymer polymerization, as a non-limiting example, Ziegler-Natta catalysts or metallocene catalysts may be used. As a preferred example, a catalyst system comprised of: a catalyst prepared by reacting dialkoxy magnesium with a titanium compound and an internal electron donor in the presence of an organic solvent; alkylaluminum; and an external electron donor may be used to polymerize propylene and comonomers so as to obtain a propylene random copolymer. For example, a catalyst system formed by combining: a catalyst mentioned in Korean laid-open patent publication Nos. 2006-0038101, 2006-0038102, 2006-0038103 and the like; alkylaluminum; and a proper external electron donor may be used. During the polymerization process, various additives such as a chain transfer agent, scavenger or other additives may be used.

The method for polymerizing propylene random copolymer resins is not specifically limited, and for example bulk polymerization, solution polymerization, slurry polymerization, gas phase polymerization and the like may be used, whether it is a batch type or a continuous type. Further, such polymerization methods may be combined and a continuous type gas phase polymerization is preferred in economic terms.

When polymerizing the propylene random copolymers, many polymerization baths may be placed in series; and polymerization may be serially carried out while making the polymerization degree in each polymerization bath similar to or different from each other.

The separator for a lithium secondary battery of the present invention may be prepared by a resin composition further comprising various additives other than the propylene random copolymer, such as an antioxidant for ensuring a long term thermal-resistance and oxidation stability, a reinforcing agent, a filler, a heat stabilizing agent, a weather resistant agent, an antistatic agent, a lubricant, a slipping agent, a pigment and the like, as long as the purpose of the present invention can be achieved and the battery operation is not interfered, even when applied to a lithium secondary battery. The species of the additives are not specifically limited as long as they are well-known in the art.

The method for preparing a resin composition is not specifically limited, and any generally known method for preparing a polypropylene resin composition may be used as it is or as being suitably modified. Each component for the resin composition may be optionally selected and mixed in a desired order without being specifically limited. The composition may be prepared by, for example, placing the propylene random copolymer and other additives in a desired amount in a mixer such as a kneader, a roll, a Banbury mixer, etc., or a uniaxial or biaxial extruder, and mixing them together therein.

The method for preparing a separator for a lithium secondary battery according to the present invention comprises the following steps of: (A) extruding the propylene random copolymer or a resin composition containing the same so as to provide a precursor film and (B) elongating the resulted precursor film so as to form a microporous separator which has micropores formed therein and a shutdown property.

Specifically, firstly, the propylene random copolymer or a resin containing the same is extruded to provide a precursor film for preparing a midcroporous film that is a purpose of the present invention, wherein the lamellae of the precursor film are oriented vertically to the machine direction(MD) and are arranged along MD.

Although the film formation method is not specifically limited, it is possible to form a film by using a single screw or twin screw extruder with a T die or cyclic die at a temperature range of 150-250° C., and further air may be sprayed thereon through an air knife or air ring for making the temperature control of the discharged resin easy and improving the prepared film condition. When using a take-up roll, the roll speed is preferably constant and specifically the speed ranged between 10 m/min or more and 1000 m/min or less is preferred. When the take-up roll speed is less than 10 m/min, the orientation of a resin may be made insufficiently, and when it is more than 1000 m/min, the uniformity of the prepared film is lowered or the film may be torn apart during the film formation process.

In the preparation of the microporous separator of the present invention by carrying out elongation of the above extruded non-porous precursor film, annealing may be carried out before the elongation process, wherein annealing can be carried out by, as an non-limiting example, placing the film roll in an heat-convection oven or by heating the film via a heating roll. The precursor film preferably has an elastic recovery in the range of 50% or more and 99% or less. If elastic recovery is less than 50%, fragmentation of a lamella structure during the subsequent elongation process may occur so that sufficient pores cannot be formed, and when it is more than 99%, the orientation of lamellae occurs too excessively, possibly causing a break in a film along the lamella face during the subsequent elongation process. The method for measuring the elastic recovery is described in the physical properties measurement/evaluation methods in the following Examples.

As for the non-limiting example, the elongation process can be carried out uniaxially or biaxially by using an elongation roll or a tenter. As a preferred example, the precursor film as prepared as above described is firstly uniaxially elongated at the ratio of 10-70% at 20-25° C., and after raising the temperature as high as 90-150° C., then secondly uniaxially elongated at the ratio of 50-250% and cooled, thereby obtaining a separator in the form of a microporous film with a shutdown function according to the present invention.

The separator of a lithium secondary battery according to the present invention has a thickness of 1-100 μm and a porosity of 20-99%, and exerts the shutdown function at a temperature of 137° C. or less.

The monolayered microporous separating film having a shutdown function which comprises propylene random copolymer as prepared above may be sufficiently applied alone as a separator for a lithium secondary battery, however, in order to add higher mechanical strength and a melt-down blocking function, the separator for a lithium secondary battery of the present invention may further comprise a high rigid/high thermal-resistant microporous layer on either or both side of the microporous film having a shutdown function.

Specifically, the additional microporous layer having a high rigid/high thermal-resistant function is comprised of a polymer material having a melting point or glass transition temperature of 160° C. or more, and the non-limitative example of such polymer material includes polypropylene homopolymer, polyethylene terephthalate, polybutylene terephthalta, polyester, polyacetal, polyamide, polyimide, polycarbonate, polyetheretherketone, polyether sulfone, polyphenylene oxide, polyphenylene sulfide and the like, without being limited by the preparation method or type such as for example in the form of a porous film or non-woven fabric prepared by a dry process or wet process. Further, the microporous layer having a melt-down blocking function may further comprise mineral particles other than said polymer material. In such case, the mineral particles are fixed by a binder, and a pore structure is formed by the empty spaces between the mineral particles.

The preparation of the separator for a lithium secondary battery according to the present invention comprised of a microporous film made of a propylene random copolymer having a shutdown function and a microporous layer having a high rigid/high thermal-resistant melt-down blocking function is not specifically limited and, for example, it can be prepared by preparing each microporous layer and then combined together by heat sealing or by annealing/elongation at a low temperature/elongation at a high temperature of a precursor layer prepared by co-extrusion.

EXAMPLES

Hereinafter, the present invention is further illustrated in detail by the following examples, however they are by no means limit the scope of the present invention.

The methods for determining general physical properties in the examples and comparative examples are as follows.

Methods for Determination/Evaluation of Physical Properties

1) Melt Index

Melt index was measured according to ASTM D1238, at 230° C., under the load of 2.16 kg.

2) Thickness

Thickness of a separator was measured according to ASTM D374.

3) Tensile Strength

Tensile strength was measured according to ASTM D3763, by using a universal testing machine(UTM).

4) Elastic Recovery(ER)

Using a universal testing machine(UTM), a precursor film having a width of 15 mm was elongated at an elongation speed of 50 mm/min, starting from the Grip interval of 50 mm($L_0$), and immediately after 100% elongation, it was recovered at the speed of 50 mm/min. At the point when remaining stress becomes 0, the length($L_1$) was measured and calculated according to the following equation.

$$ER(\%)=(L_1-L_0)/L_0\times100$$

5) Air Permeability(Gurley)

According to Japan Industry Standard(JIS), time(second) taken for 100 mL air to pass a microporous film of 1 square inch(1 inch$^2$) at room temperature under 4.8 inch $H_2O$ was measured.

6) Void Fraction (Porosity)

50 mm×50 mm porous film was cut, and its density was calculated by measuring the thickness and weight. In other words, the volume was measured by width×height×thickness and density($\rho_1$) was determined by dividing the measured weight by a volume. The porosity(P) was determined by using the following equation by using the true density($\rho_0$) and the film density($\rho_1$) measured as above. The true density of the polypropylene was 0.905 g/cm$^3$.

$$P(\%)=(\rho_0-\rho_1)/\rho_0\times100$$

7) Shutdown Temperature

Shutdown temperature was defined and measured as a temperature at which a battery impedance becomes 100 times as high as the initial value during the course of temperature elevation at the speed of 10° C./minute

EXAMPLES AND COMPARATIVE EXAMPLES

The polypropylene resins used in the examples and the comparative examples were summarized in the following Table 1.

Based on 100 parts of a polypropylene resin, 500 weight ppm of Irganox 1010(i-1010), Irgafos 168(i-168) and calcium stearate, respectively were fed to a twin screw mix-extruder (Han-Kook EM, 32 mm twin extruder) at once and mixed to prepare a polypropylene resin composition. The polypropylene resin composition was extruded at 200° C. through a single screw extruder with T-die, at the take-up speed of 25 m/min so as to prepare a precursor film. Each precursor film was uniaxially elongated subsequently at the ratio of 25% at room temperature and then 175% at 120° C., achieving 200% elongation in total, thereby preparing a microporous film for a separator.

Physical properties of each film as prepared above were measured and the results were summarized in the following Table 1.

TABLE 1

| | | example 1 | example 2 | example 3 | comp. example 1 | comp. example 2 | comp. example 3 | comp. example 4 | comp. example 5 | comp. example 6 |
|---|---|---|---|---|---|---|---|---|---|---|
| resins | species | propylene random copolymer | propylene random copolymer | propylene random copolymer | propylene homo-polymer | ethylene homo-polymer | propylene random copolymer | propylene random copolymer | propylene random copolymer | propylene random copolymer |
| | melt index (g/10 min) | 3.1 | 3.0 | 3.2 | 2.8 | 2.9 | 3.1 | 3.1 | 0.3 | 15.0 |
| first comonomer | species | ethylene | butene | ethylene | — | — | ethylene | ethylene | ethylene | ethylene |
| | content(wt %) | 5.1 | 4.2 | 3.7 | — | — | 0.05 | 8.7 | 4.6 | 4.2 |
| second comonomer | species | | | butene | | | | | | |
| | content(wt %) | — | — | 2.8 | — | — | — | — | — | — |
| precursor film | thickness (micron) | 24 | 25 | 24 | 26 | 25 | 25 | 24 | film formation was | 23 |
| | elastic | 86 | 88 | 85 | 91 | 78 | 89 | 35 | | 64 |

TABLE 1-continued

|  |  | example 1 | example 2 | example 3 | comp. example 1 | comp. example 2 | comp. example 3 | comp. example 4 | comp. example 5 | comp. example 6 |
|---|---|---|---|---|---|---|---|---|---|---|
|  | recovery(%) |  |  |  |  |  |  |  | impossible |  |
| porous film | thickness (micron) | 19 | 20 | 19 | 21 | 18 | 21 | 15 |  | 17 |
|  | tensile strength (kgf/mm2) | 22 | 20 | 19 | 23 | 17 | 23 | 14 |  | 16 |
|  | porosity(%) | 45 | 47 | 44 | 49 | 44 | 49 | 0 |  | 16 |
|  | air-permeability | 231 | 217 | 228 | 192 | 273 | 203 | >1000 |  | 872 |
|  | shutdown temperature (° C.) | 132 | 135 | 130 | 162 | 132 | 158 | — |  | 131 |

* Ethylene homopolymer used in the comparative example 2 was high density polyethylene(HDPE).

As seen from the above Table 1, in Examples 1-3 according to the present invention, it was confirmed that a shutdown effect appeared while air permeability was ensured.

In Comparative example 1 in which a porous film was prepared by using a propylene homopolymer under the same process condition as in Example 1, although air permeability was ensured, the shutdown temperature was high, disadvantageously.

In Comparative example 2 in which a porous film was prepared by using an ethylene homopolymer, although air permeability was ensured, the tensile strength was low, disadvantageously.

In Comparative example 3 in which propylene random copolymer of which ethylene, i.e. the comonomer content was lower than what it is required in the present invention was used, although air permeability was ensured, the shutdown temperature was high, disadvantageously as in Comparative example 1.

In Comparative example 4 in which propylene random copolymer of which ethylene, i.e. the comonomer content was higher than what it is required in the present invention was used, elastic recovery of the precursor film was low; tensile strength of the porous film which was obtained from elongation of the precursor film was also low; and air permeability was not ensured disadvantageously.

In Comparative example 5 in which propylene random copolymer, from which obtained resin has a melt index lower than what is required in the present invention, its extrusion under the process conditions as in Examples according to the present invention was not possible.

In Comparative example 6 in which propylene random copolymer, from which obtained resin has a melt index higher than what is required in the present invention, elastic recovery of the precursor film was low, and air permeability of the porous film which was obtained from elongation of the precursor film was not ensured disadvantageously.

What is claimed is:

1. A microporous separator for a lithium secondary battery having a shutdown function consisting of a microporous monolayer film, consisting of a propylene random copolymer resin,
    wherein the propylene random copolymer has a melt index of 0.5-10 g/10 minutes at 230° C. and under a load of 2.16 kg and comprises one or more comonomers in the amount of 0.1 to 8 wt % of the propylene random copolymer, and
    wherein the microporous separator exerts a shutdown function at the temperature of 137° C. or less.

2. The microporous separator according to claim 1, which has a thickness of 1-100 μm and a porosity of 20-99%.

3. The microporous separator according to claim 1, which is prepared via the processes of extrusion in the form of a non-porous film, annealing and elongation at 20-25° C. and then at 90-150° C.

* * * * *